(12) United States Patent
Smith et al.

(10) Patent No.: US 6,220,547 B1
(45) Date of Patent: Apr. 24, 2001

(54) LARGE SCALE PARAFOIL APPARATUS WITH AN ENERGY ATTENUATOR FOR CONTROLLING INITIAL DEPLOYMENT

(75) Inventors: John J. Smith, Middletown; Thomas W. Bennett, Lebanon, both of CT (US); Roy L. Fox, Jr., Belleville, WV (US)

(73) Assignee: Pioneer Aerospace Corporation, South Windsor, CT (US)

( * ) Notice: Subject to any disclaimer, the term of this patent is extended or adjusted under 35 U.S.C. 154(b) by 0 days.

(21) Appl. No.: 09/327,926

(22) Filed: Jun. 8, 1999

(51) Int. Cl.$^7$ .................................................. B64D 17/48
(52) U.S. Cl. ........................ 244/147; 244/149; 244/152
(58) Field of Search ................................... 244/142, 145, 244/147, 148, 149, 151 R

(56) References Cited

U.S. PATENT DOCUMENTS

| | | |
|---|---|---|
| 1,138,140 | 5/1915 | Olster . |
| 1,319,546 | 10/1919 | Whaley . |
| 1,393,082 | 10/1921 | Calthrop . |
| 1,780,190 | 11/1930 | Hoffman . |
| 1,909,158 | 5/1933 | Albihn . |
| 1,951,864 | 3/1934 | Driggs, Jr. . |
| 2,019,437 | 10/1935 | Knight . |
| 2,149,540 | 3/1939 | Muller . |
| 2,356,493 | 8/1944 | Smith . |
| 2,379,758 | 7/1945 | Smith . |
| 2,472,601 | 6/1949 | Mallory . |
| 2,474,124 * | 6/1949 | Schultz ................................ 244/151 |
| 2,511,263 | 6/1950 | Hiscock . |
| 2,517,417 | 8/1950 | Quilter . |
| 2,525,798 | 10/1950 | Hattan . |
| 2,702,679 * | 2/1955 | Culver .................................. 244/148 |
| 2,762,589 * | 9/1956 | Frieder et al. ....................... 244/148 |
| 2,949,263 | 8/1960 | Steinthal . |
| 2,954,191 | 9/1960 | Moran . |
| 2,998,950 | 9/1961 | Fritz et al. . |
| 3,032,072 | 5/1962 | Weiner et al. . |
| 3,055,621 | 9/1962 | Martin . |
| 3,145,956 | 8/1964 | Widdows . |
| 3,386,692 | 6/1968 | Schuerch . |
| 3,462,101 | 8/1969 | Chevrier . |
| 3,599,908 | 8/1971 | Martin . |
| 3,655,152 | 4/1972 | Bonn et al. . |
| 3,773,284 | 11/1973 | Matsuo et al. . |
| 3,776,493 | 12/1973 | Matsuo . |
| 3,780,970 | 12/1973 | Pinnell . |
| 3,804,698 | 4/1974 | Kinloch . |

(List continued on next page.)

Primary Examiner—Galen L. Barefoot
(74) Attorney, Agent, or Firm—Sperry, Zoda & Kane

(57) ABSTRACT

A large scale parafoil apparatus which makes use of an energy attenuator positioned between the initially deployed drogue parachute and the parafoil for controlling the initial stages of deployment thereof and significantly reducing rebound to enhance the deployment of the parafoil canopy in an orderly manner with the suspension lines thereof extending from the canopy to the load retained therebelow being maintained under continual tension during canopy deployment for enhancing rapid and full deployment thereof. The energy attenuating device is a ripstitch modulator having preferably multiple ripstitch sections for gradually decreasing the force resistant to separating the drogue from the parafoil and ultimately completely separating to allow full deployment of the parafoil canopy. The parafoil canopy defines a plurality of air cells with one main air cell being deployed in the lateral central location thereof. This main air cell is preferably reinforced with additional structural members and is the preferably the only cell directly attached to the drogue parachute through the energy attenuation device for enhancing deployment of the parafoil canopy. A bridle configuration can be included for maintaining attachment between the drogue and parafoil canopy during initial deployment thereof.

21 Claims, 5 Drawing Sheets

U.S. PATENT DOCUMENTS

| | | |
|---|---|---|
| 3,829,046 | 8/1974 | Matsuo et al. . |
| 3,887,151 | 6/1975 | Matsuo . |
| 3,931,945 | 1/1976 | Sepp . |
| 3,937,407 | 2/1976 | Matsuo . |
| 3,989,207 | 11/1976 | Mader . |
| 4,137,352 | 1/1979 | Stonebridge . |
| 4,390,149 | 6/1983 | Barnes et al. . |
| 4,446,944 | 5/1984 | Forrest et al. . |
| 4,469,296 | 9/1984 | Lee . |
| 4,520,899 | 6/1985 | Vasquez . |
| 4,529,153 | 7/1985 | Conn . |
| 4,618,026 | 10/1986 | Olson . |
| 4,753,772 | 6/1988 | Schmertz . |
| 4,771,970 | 9/1988 | Sutton . |
| 4,948,071 | 8/1990 | Summers, III . |
| 5,016,533 | 5/1991 | Borngen . |
| 5,123,616 | 6/1992 | Buckley et al. . |
| 5,143,187 | 9/1992 | McQuarrie . |
| 5,213,288 | 5/1993 | Girdwood . |
| 5,233,126 | 8/1993 | Karius et al. . |
| 5,260,122 | 11/1993 | Prevorsek et al. . |
| 5,263,663 | 11/1993 | Widgery . |
| 5,330,133 | 7/1994 | Rasmussen . |
| 5,393,016 | 2/1995 | Howard et al. . |
| 5,433,290 | 7/1995 | Ellis et al. . |
| 5,598,900 | 2/1997 | O'Rourke . |
| 5,799,760 | 9/1998 | Small . |

\* cited by examiner

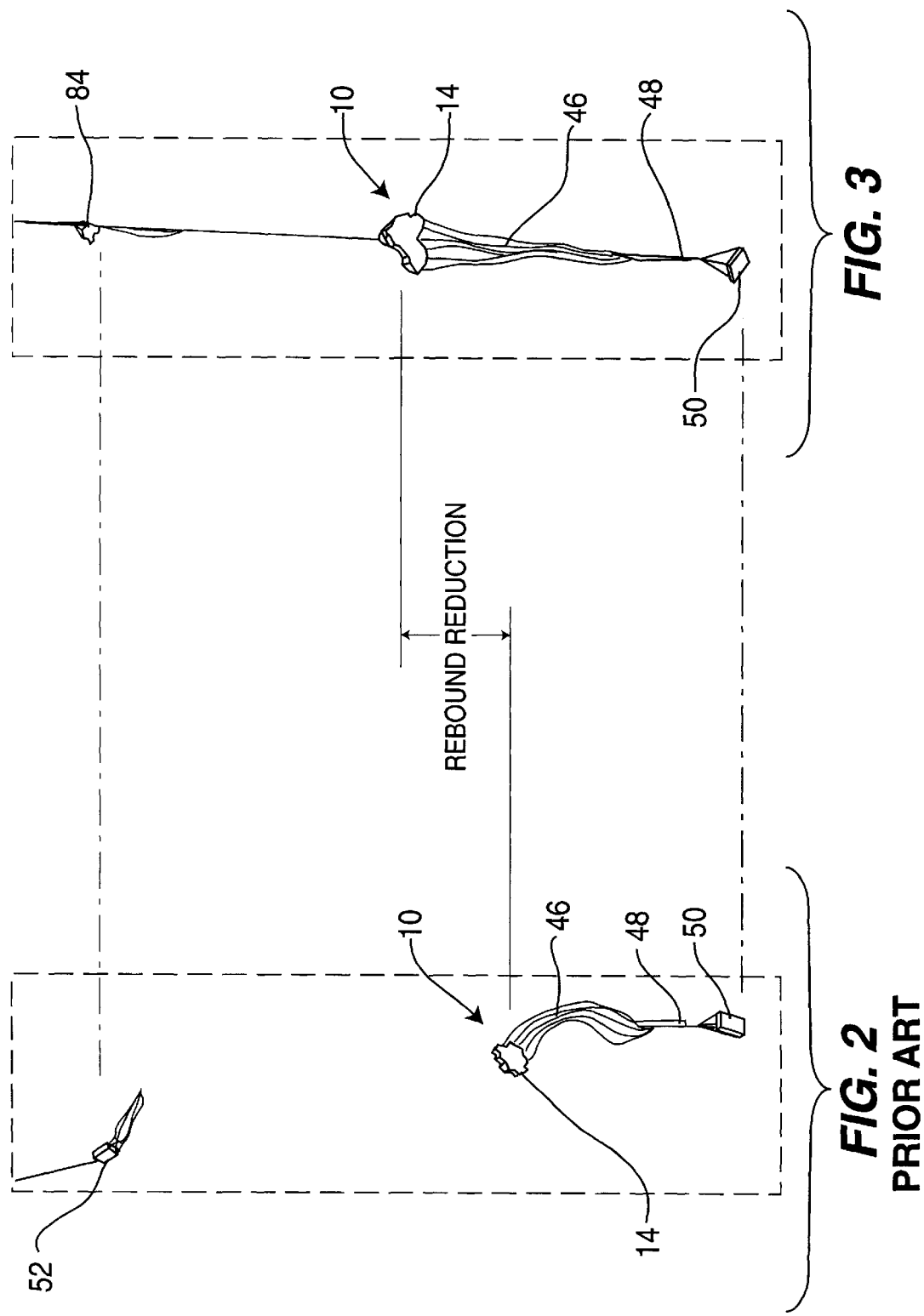

LARGE SCALE PARAFOIL APPARATUS WITH AN ENERGY ATTENUATOR FOR CONTROLLING INITIAL DEPLOYMENT

BACKGROUND OF THE INVENTION

1. Field of the Invention

The present invention deals with the field of parachute devices generally but more specifically deals with the field of parafoil parachute devices. Such parafoil parachute devices have enhanced directional steering capabilities and are formed by a plurality of longitudinally extending air cells positioned generally parallel with respect to one another to form the canopy thereof.

The present invention is generally useful for all sized parafoil canopies but is more particularly pertinent to large scale parafoils on the order of greater than 5000 square feet of surface area which is designed for use with heavy payloads generally greater than 15,000 lbs. Although this is the capability limit of the present invention it is designed to be particularly usable with a 7500 square foot parafoil and a 24,200 lb. payload.

2. Description of the Prior Art

Numerous devices have been utilized for dissipating the energy of parachutes. However, none have combined the use of a ripstitch energy attenuator with a parafoil parachute as shown in the present invention. Examples of these prior art patents are shown in U.S. Pat. No. 1,138,140 patented May 4, 1915 to A. Olster on a "Parachute Device"; and U.S. Pat. No. 1,319,546 patented Oct. 21, 1919 to W. W. Whaley and assigned one-half to Lewis E. Whaley on a "Parachute"; and U.S. Pat. No. 1,393,082 patented Oct. 11, 1921 to E. R. Calthrop and assigned to E. R. Calthrop's Aerial Patents Limited on a "Parachute"; and U.S. Pat. No. 1,780,190 patented Nov. 4, 1930 to E. L. Hoffman on a "Parachute"; and U.S. Pat. No. 1,909,158 patented May 16, 1933 to H. F. Albihn on a "Parachute"; and U.S. Pat. No. 1,951,864 patented March 20, 1934 to L. L. Driggs, Jr. and assigned to International Flare-Signal Company on a "Parachute"; and U.S. Pat. No. 2,019,437 patented Oct. 29, 1935 to S. H. Knight and assigned to Follmer, Clogg & Co., Inc. on a "Parachute"; and U.S. Pat. No. 2,149,540 patented Mar. 7, 1939 to W. Muller on a "Parachute"; and U.S. Pat. No. 2,356,493 patented Aug. 22, 1944 to P. F. Smith and assigned to Pioneer Parachute Company, Inc. on a "Parachute"; and U.S. Pat. No. 2,379,758 patented Jul. 3, 1945 to P. F. Smith and assigned to Pioneer Parachute Company, Inc. on a "Parachute Construction"; and U.S. Pat. No. 2,472,601 patented Jun. 7, 1949 to H. R. Mallory and assigned to Pioneer Parachute Company, Inc. on a "Parachute Canopy"; and U.S. Pat. No. 2,511,263 patented Jun. 13, 1950 to E. F. Hiscock on a "Parachute Construction"; and U.S. Pat. No. 2,517,417 patented Aug. 1, 1950 to J. R. C. Quilter on a "Parachute"; and U.S. Pat. No. 2,525,798 patented Oct. 17, 1950 to M. Hattan on a "Shockless Parachute"; and U.S. Pat. No. 2,949,263 patented Aug. 16, 1960 to A. J. Steinthal and assigned to M. Steinthal & Co., Inc. on a "Drag Chute System For Aircraft"; and U.S. Pat. No. 2,954,191 patented Sep. 27, 1960 to H. J. Moran and assigned to Switlik Parachute Company, Inc. on a "Controlled Flow Parachute Canopy"; and U.S. Pat. No. 2,998,950 patented Sep. 5, 1961 to A. G. Fritz et al on an "Integrated Parachute Deployment Pack"; and U.S. Pat. No. 3,032,072 patented May 1, 1962 to L. I. Weiner et al and assigned to the United States of America as represented by the Secretary of the Army on a "Parachute Fabric Containing Stretch And Non-Stretch-Type Ripstops"; and U.S. Pat. No. 3,055,621 patented Sep. 25, 1962 to J. Martin on a "Parachute Apparatus"; and U.S. Pat. No. 3,145,956 patented Aug. 25, 1964 to H. E. Widdows and assigned to the United States of America as represented by the United States Atomic Energy Commission on a "Parachute Deployment Control Assembly"; and U.S. Pat. No. 3,359,040 patented to Richard L. Every et al on Dec. 19, 1967 and assigned to Continental Oil Company on a "Pipe-lining Of Solids"; and, U.S. Pat. No. 3,3,386,692 patented Jun. 4, 1968 to H. U. Schuerch and assigned to Astro Research Corporation on a "Parachute"; and U.S. Pat. No. 3,462,101 patented Aug. 19, 1969 to F. X. Chevrier and assigned to Hi-Tek Corporation on a "Parachute Ripcord"; and U.S. Pat. No. 3,599,908 patented Aug. 17, 1971 t James Martin on a "Parachute Apparatus"; and U.S. Pat. No. 3,655,152 patented April 11, 1972 to Clifford Bonn et al and assigned to Irvin Air Chute, Limited on a "Stretch Fabric Parachute Canopy"; and U.S. Pat. No. 3,773,284 patented Nov. 20, 1973 to J. T. Matsuo et al and assigned to the United States of America as represented by the Secretary of the Army on a "Controllable Multi-Stage Increasing Drag Parachute"; and U.S. Pat. No. 3,776,493 patented Dec. 4, 1973 to J. T. Matsuo and assigned to the United States of America as represented by the Secretary of the Navy on a "Parachute Decoupling Apparatus"; and U.S. Pat. No. 3,780,970 patented Dec. 25, 1973 to W. R. Pinnell and assigned to the United States of America as represented by the Secretary of the Air Force on a "Parachute Apparatus"; and U.S. Pat. No. 3,804,698 patented Apr. 16, 1974 to J. C. Kinlock and assigned to the United States of America as represented by the Secretary of the Navy on an "Adhesively Releasable And Reusable Shock Load Absorbing System"; and U.S. Pat. No. 3,829,046 patented Aug. 13, 1974 to J. T. Matsuo et al and assigned to the United States of America as represented by the Secretary of the Navy on a "Programmable, Reversible Drag, Multi-Stage Parachute"; and U.S. Pat. No. 3,887,151 patented Jun. 3, 1975 to J. T. Matsuo and assigned to the United States of America as represented by the Secretary of the Navy on an "Apparatus And Method For Controlling the Inflation Time And Applied Snatch Forces On A Parachute"; and U.S. Pat. No. 3,931,945 patented Jan. 13, 1976 to 0. W. Sepp and assigned to ILC-Steinthal, Inc. on a "Rotating Parachute"; and U.S. Pat. No. 3,937,407 patented Feb. 10, 1976 to J. T. Matsuo and assigned to the United States of America as represented by the Secretary of the Navy on a "Multiple Strap Shock Absorber"; and U.S. Pat. No. 3,989,207 patented Nov. 2, 1976 to H. B. Mader and assigned to Bruggemann & Brand KG on a "Parachute With Delayed Opening"; and U.S. Pat. No. 4,137,352 patented Jan. 30, 1979 to A. L. Stonebridge and assigned to BBA Group Limited on "Methods Of Making Loops In Strip Fabric Material"; and U.S. Pat. No. 4,390,149 patented Jun. 28, 1983 to T. L. Barnes et al and assigned to The Balloon Works, Inc. on a "Balloon Envelope And Method Of Fabricating Same"; and U.S. Pat. No. 4,446,944 patented May 8, 1984 to W. E. Forrest et al and assigned to Forrest Mountaineering, Inc. on a "Shock Absorbing Device And Method"; and U.S. Pat. No. 4,469,296 patented Sep. 4, 1984 to R. P. Lee on a "Fishing Kite"; and U.S. Pat. No. 4,520,899 patented Jun. 4, 1985 to T. V. Carrera on a "Parachute Apparatus With Shock Absorber"; and U.S. Pat. No. 4,529,153 patented Jul. 16, 1985 to S. H. Conn and assigned to The Balloon Works, Inc. on a "One-Piece Load Line Pocket For Balloon"; and U.S. Pat. No. 4,618,026 patented Oct. 21, 1986 to W. L. Olson and assigned to Rose Manufacturing Company on an "Apparatus And Method For Producing A Counteracting Force"; and U.S. Pat. No. 4,753,772 patented Jun. 28, 1988 to J. C. Schmertz and assigned to Westinghouse Electric Corp. on a "Multi-Strap Shock Absorber"; and U.S. Pat. No. 4,771,970 patented Sep. 20, 1988 to S. J. Sutton on a "Pressure Flow Control Device"; and U.S. Pat. No. 4,948,071 patented Aug. 14, 1990 to C. M. Summers, III and assigned to Glide Path International, Inc. on a "Deployment System For Parachute"; and U.S. Pat. No. 5,016,533 patented May 21, 1991 to L. Borngen and assigned to Rheinmetall GmbH on a "Bomblet Projectile Including A Stabilization Band"; and U.S. Pat. No. 5,123,616 patented Jun. 23, 1992 to J. A. Buckley et al and assigned to the United States of America as represented by the Secretary of the Navy on a "High Efficiency, Low Weight And Volume Energy Absorbent Seam"; and U.S. Pat. No. 5,143,187 patented Sep. 1, 1992 to R. H. McQuarrie et al and assigned to Ontario Hydro on an "Energy Absorber For Horizonal Lifelines In Fall Arrest Systems"; and U.S. Pat. No. 5,213,288 patented May 25, 1993 to N. T. Girdwood and assigned to Parachute Industries of Southern Africa (PTY) LTD on a "Parachute Opening Shock Reducing System"; and U.S. Pat. No. 5,233,126 patented Aug. 3, 1993 to Klaus-Diemar Karius et al and assigned to Rheinmetall GmbH on a "Deceleration Device For A Submunition Unit With Textile Package For Deceleration Element"; and U.S. Pat. No. 5,260,122 patented Nov. 9, 1993 to D. C. Prevorsek et al and assigned to Allied-Signal Inc. on an "Impact Resistant Woven Body"; and U.S. Pat. No. 5,263,663 patented Nov. 23, 1993 to W. T. Widgery on a "Stowage Band Adapted For Releasably Maintaining Parachute Suspension Lines In A Looped Condition And Method Of Using The Same"; and U.S. Pat. No. 5,330,133 patented Jul. 18, 1994 to 0. Rasmussen on a "Parachute With Shock Absorbing Feature"; and U.S. Pat. No. 5,393,016 patented Feb. 28, 1995 to C. D. Howard et al and assigned to the United States of America as represented by the Secretary of the Navy on an "Energy Absorption Device For Shock Loading"; and U.S. Pat. No. 5,433,290 patented Jul. 18, 1995 to J. N. Ellis et al and assigned to Research & Trading Corporation on a "Safety Line Shock Absorber"; and U.S. Pat. No. 5,598,900 patented Feb. 4, 1997 to M. J. O'Rourke and assigned to Surety Manufacturing & Testing Ltd. on a "Horizontal Lifeline Energy Absorber"; and U.S. Pat. No. 5,799,760 patented Sep. 1, 1998 to G. E. Small on an "Energy Absorbing Device".

SUMMARY OF THE INVENTION

The present invention provides a large scale parafoil apparatus having an energy attenuating device utilized therein for controlling the initial stage of deployment of the parafoil canopy. Such a parafoil generally includes a canopy having a plurality of parallel extending inflatable air cells which are adjacently positioned and extend longitudinally adjacent to one another. Each of these air cells defines a front opening for receiving air therein. These conduits and the lines extending downwardly therefrom provide directional steering capability to the parafoil and also form the canopy thereof. The canopy of the present design can be greater than 5,000 square feet in surface area and can be as high as 7,000 to 8,000 square feet or greater depending upon the weight of the payloads used therewith.

Each canopy defines a main air cell which is positioned centrally within the parafoil with an equal number of air cells on each side laterally therefrom. This main air cell is therefore centrally located in the span of the parafoil canopy. This main air cell includes an upper panel and a lower panel with two side panels extending vertically between upper and lower panels in such a manner as to form a generally square or rectangular main air cell.

This main air cell in most configurations is the only air cell which is attached with respect to the drogue parachute during initial deployment and therefore requires reinforcement members. A plurality of first reinforcing ribbons can extend vertically along the first side panel for reinforcing thereof and similarly a plurality of second reinforcing ribbons can extend vertically along the second side panel for reinforcing thereof. An upper panel reinforcing member may extend across the upper panel for reinforcing it and the lower panel reinforcing member can extend across the lower panel for reinforcing that section. Also a first and second reinforcing hem may extend along the inner section of the upper panel with a first side panel member and a second side panel member for reinforcing it such that when this single main air cell receives force exerted thereon during deployment it is capable of withstanding these significant forces.

The parafoil further includes a plurality of suspension lines attached with respect to the canopy and extending downwardly therefrom to a load retaining device such as load dispersion risers which are attached to the confluence of the suspension lines below the canopy to be securable with respect to payload for suspension thereof below the canopy.

A canopy containment means is also attached to the parafoil and is adapted to maintain the parafoil collapsed prior to deployment thereof. A drogue parachute is also attached with respect to the canopy containment device and it is operative upon deployment to disengage the canopy containment device from the parafoil to facilitate deployment thereof and deployment of the canopy.

An energy attenuating device such as a ripstitch modulator may be attached with respect to the drogue parachute and with respect to the main air cell of the parafoil in such a manner as to be operative to facilitate controlling initial deployment thereof by maintaining attachment between the drogue parachute and the parafoil for a limited period of time after release thereof by the canopy containment device. This energy attenuating device is preferably operative to maintain tension on the suspension lines of the parafoil between the load retaining dispersion risers and the canopy thereof immediately after release of the canopy and for a limited time thereafter prior to full deployment.

This energy attenuating device is also particularly operative to separate completely after stitching failure to completely disengage the drogue parachute from the parafoil and allow full deployment of the canopy. The preferred configuration for the ripstitch modulator includes a plurality of ripstitch stage sections which each exert forces in parallel with respect to one another. Preferably each of these ripstitch stage sections is operative over a predetermined different time period to provide gradually decreasing resistance over time against the separation of the drogue parachute from the parafoil. The energy attenuation device is preferably attached with respect to the canopy containment means and that means is preferably attached with respect to the drogue parachute to maintain attachment of the energy attenuation device with respect to the drogue parachute through the canopy containment device. The ripstitch modulator is preferably operative to gradually fail over a limited period of time and allow the parafoil to slowly pull away from the drogue parachute while maintaining forcible resistance therebetween and also while maintaining tension between the canopy and the load during the initial stages of deployment of the canopy.

In the preferred configuration the ripstitch modulator includes a first fabric member secured with respect to the parafoil and extending upwardly therefrom. It also preferably includes a second fabric member secured with respect to the drogue parachute and extending downwardly therefrom. These two fabric members are positioned adjacent to one another and are stitched together to form a releasable ripstitch section. The ripstitch section is responsive to gradually fail or become torn after release of the parafoil by the canopy containment device and to thereafter completely fail and thus completely release the first fabric member from the second fabric member resulting in simultaneous complete release of the drogue parachute from the parafoil to allow full deployment of the parafoil canopy. Two or more such ripstitch modulators may be used in parallel to provide the necessary energy attenuation. Also three modulators or more could be used positioned in parallel in certain applications.

A bridle device may be included attached with respect to the drogue parachute in such a manner as to be secured directly to the canopy of the parafoil and, in particular, secured preferably only with respect to the main centrally located air cell thereof. In the preferred configuration this bridle device includes a first bridle line including a first frontal line and a first rear line secured along the upper panel of the main air cell adjacent the first side panel member. The first rear line is secured to the upper panel member of the main air cell adjacent the first side panel member at a position distant from the first frontal line to facilitate stability and support. A second bridle line means is similarly configured at the opposite side of the main air cell adjacent the second side panel member thereof and includes a second frontal line and a second rear line similarly configured and similarly operative.

It is an object of the present invention to provide an energy modulator for controlling initial deployment in a parachute apparatus.

It is an object of the present invention to provide a large scale parachute apparatus with an energy attenuator for controlling initial deployment thereof which can be used with extremely heavy loads ranging from 15,000 to 25,000 lbs.

It is an object of the present invention to provide a large scale parachute apparatus with an energy attenuator for controlling initial deployment thereof which is usable with extremely large parafoil canopies of 5,000 square feet or greater but is also usable with smaller parafoil canopies.

It is an object of the present invention to provide a large scale parachute apparatus with an energy attenuator for controlling initial deployment thereof which optimally has a multi-stage energy dissipation means for maintaining tension on the suspension lines of the parafoil during the initial stages of deployment of the canopy thereof.

It is an object of the present invention to provide a large scale parachute apparatus with an energy attenuator for controlling initial deployment thereof which includes attachment of a drogue parachute to a parafoil upper surface preferably at the central air cell thereof.

It is an object of the present invention to provide a large scale parachute apparatus with an energy attenuator for controlling initial deployment thereof wherein a parafoil configuration is utilized with a single centrally located main air cell with a significant amount of reinforcing material for withstanding the pressures exerted thereon during the initial stage of deployment.

It is an object of the present invention to provide a large scale parachute apparatus with an energy attenuator for controlling initial deployment thereof wherein a ripstitch attenuator will optimally exert a gradually decreasing force over time during the initial stages of deployment to facilitate full even deployment of a parafoil canopy and minimize rebound thereof which adds a minimum amount of additional expense to the prior art drogue and parafoil deployment designs.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 2 is an illustration of a prior art parafoil during deployment without the ripstitch energy attenuating means of the present invention;

FIG. 3 is an illustration of an embodiment of a parafoil of the present invention during deployment thereof;

DETAILED DESCRIPTION OF THE PREFERRED EMBODIMENT

Figure 1:
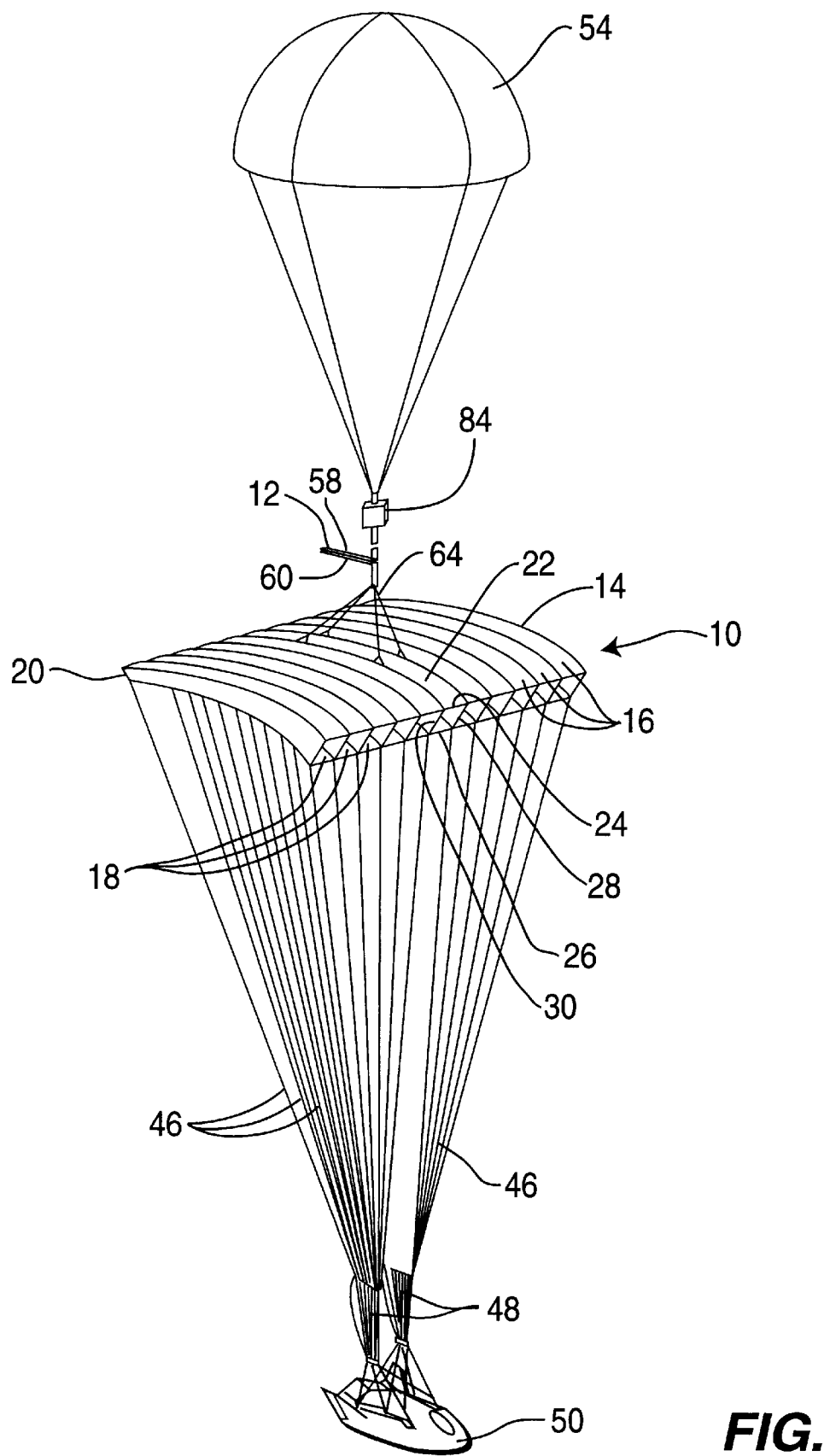
FIG. 1 is a perspective illustration of an embodiment of the large scale parafoil apparatus of the present invention.
Figure 4:
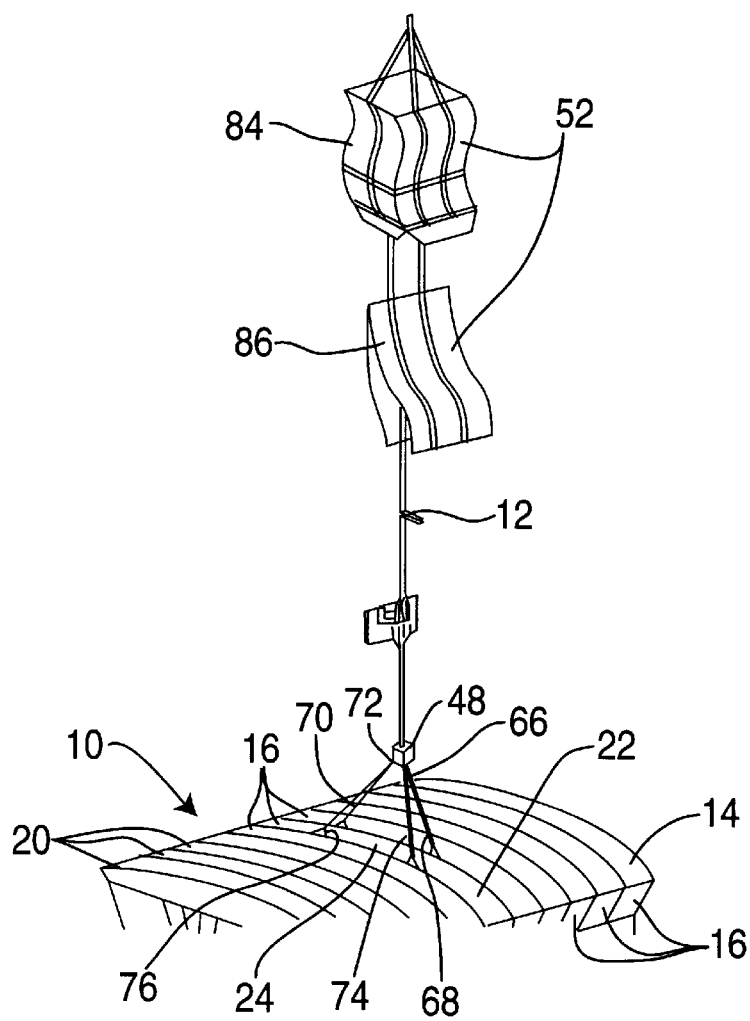
FIG. 4 is an illustration of the deployment bag, the deployment sleeve and parafoil showing the relative positioning during deployment of the parafoil.

The present invention provides a parafoil 10 having a unique configuration during deployment thereof. Most parafoils 10 can include a drogue parachute 54 designed to be deployed initially to aid in full deployment of the parafoil 10 positioned therebelow. The present invention, however, includes a uniquely configured energy attenuator 12 which comprises at least one ripstitch member for maintaining forcible resistance between the parafoil 10 and the drogue parachute 54 after the drogue parachute 54 is deployed and during the initial stage of deployment of the parafoil 10. This ripstitch modulator 12 is designed to initially exert a great amount of force and through subsequent stages or sections exert less and less force until it ultimately separates thereby achieving full separation between the parafoil 10 and the drogue parachute 54.

The configuration of the parafoil of this design includes a canopy 14 formed of a plurality of longitudinally extending air cells 16. Each of these air cells includes a front opening 18 into which air passes to provide directional steering capability and to enhance resistance to falling as exerted by the canopy 14 through the suspension lines 46 extending downwardly therefrom to a load retaining means such as dispersion risers 48. Load dispersion risers 48 are designed to be connected to a payload 50. The particular application of the present invention is for very large payloads on the order of 15,000 to 25,000 or 30,000 lbs. Such payloads require a large scale parafoil canopy 14 normally greater than 5,000 square feet.

Some time after deployment of the drogue parachute 54 the canopy containment means 52 is actuated to release the parafoil canopy 14. Preferably this canopy containment means 52 comprises a deployment bag 84 with a deployment sleeve 86 therein with the canopy 14 and other portions of the parafoil 10 held therewithin. The deployment sleeve 86 is removed from the deployment bag 84 by the different speeds of the drogue parachute after deployment and the falling payload 50. Once the deployment sleeve 86 releases the parafoil 10 therefrom the canopy 14 will start to deploy. In prior art devices the lack of connection between the parafoil canopy 14 and the drogue parachute 54 resulted in a rebound after tensioning on the suspension lines 46 of the parafoil as shown in FIG. 2. Such rebound is prevented by the use of one or more ripstitch modulators 12 of the present invention which maintains tension between the drogue parachute 54 and the canopy 14 of the parafoil 10 during initial stage of deployment thereof and gradually releases them through multiple ripstitch stages of gradually decreasing forcible resistance. The ripstitch modulator 12 in this manner also maintains tension on the suspension lines 46 between the canopy 14 of the parafoil 10 and the load 50.

Figure 5:
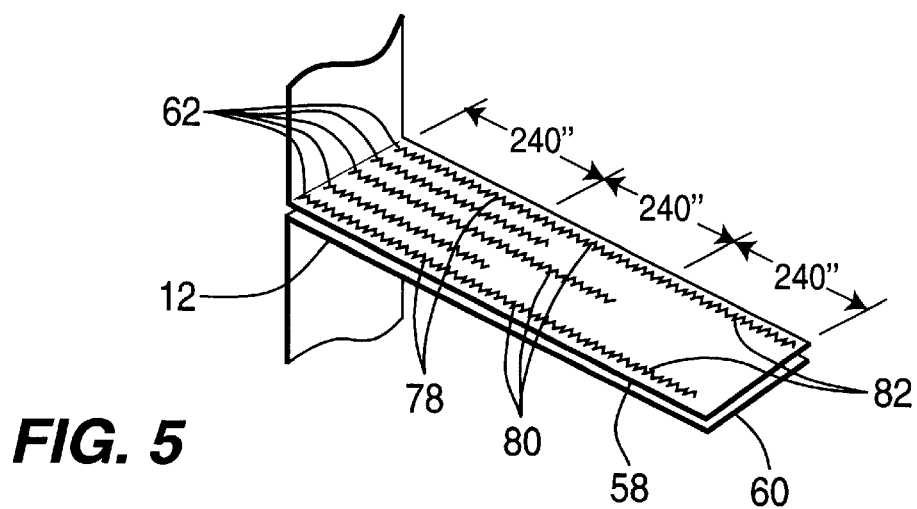
FIG. 5 is a close-up illustration of the ripstitch modulator showing the multiple stages of forcible resistance exerted in parallel by stitching between a first and second fabric member.
Figure 6:
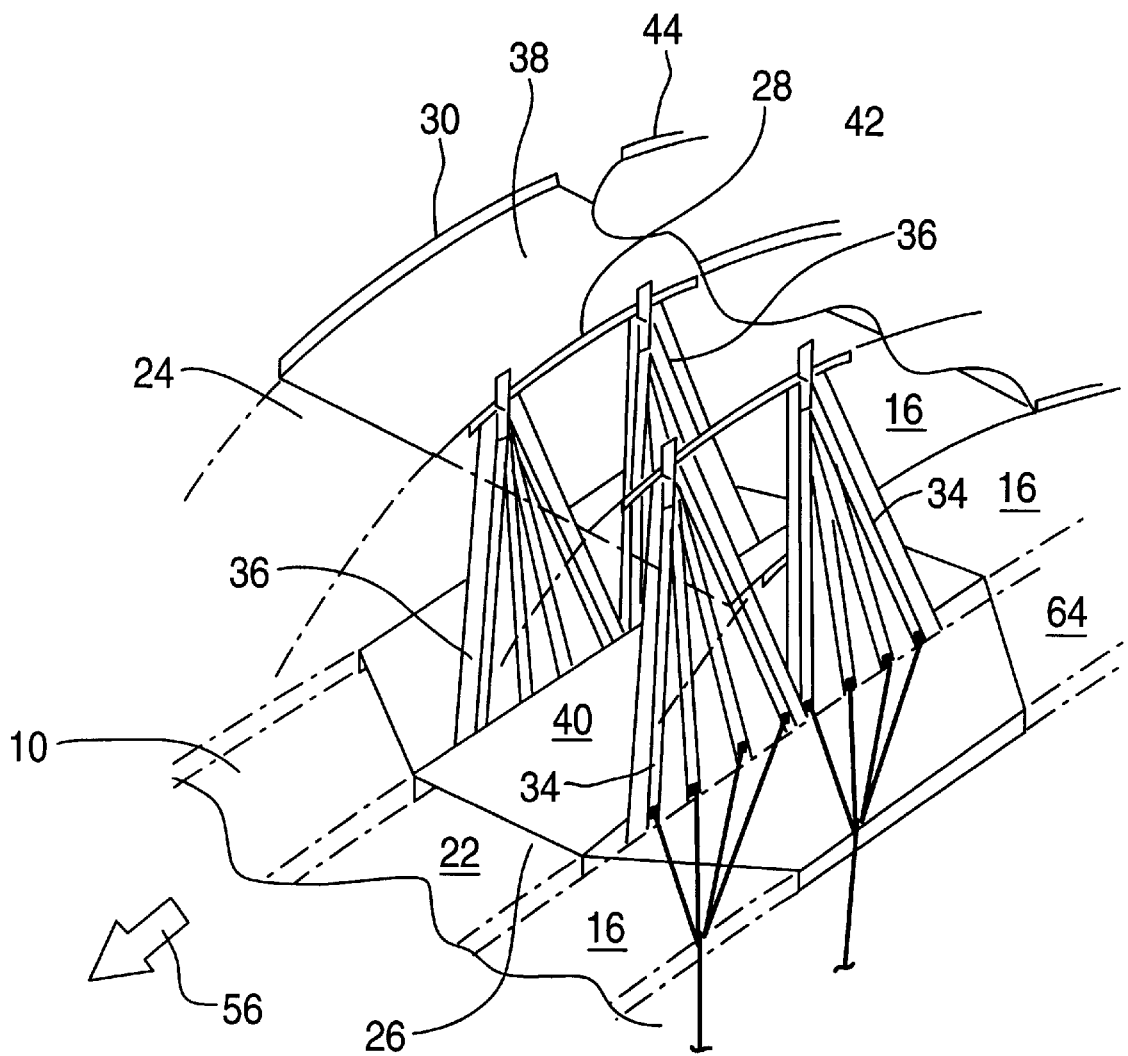
FIG. 6 is an illustration of an impartial cross section of a main air cell of an embodiment of the parafoil canopy of the present invention showing the reinforcing members.

The configuration of the ripstitch modulator 12 includes a first fabric member 58 attached with respect to the drogue parachute 54. In most configurations such that the first fabric member 58 will actually be secured with respect to the deployment sleeve 86 which is then in turn secured with respect to the deployment bag 84 which is then in turn secured with respect to the drogue parachute 54. In this way the first fabric member 58 is indirectly attached to the drogue parachute 54. The fabric member 60 is attached with respect to the canopy of the parafoil 10. These two fabric members 58 and 60 are attached to one another by stitches defined as ripstitch sections 62. Preferably multiple ripstitch sections will be utilized as best shown in FIG. 5. In FIG. 5 the first ripstitch stage section 78 will be operative over the shortest initial time period. The second ripstitch stage section 80 will then be operable over a slightly greater time period and the final ripstitch stage section 82 will be operable over the entire failure period of the ripstitch modular 12. By configuring the device as shown in FIG. 5 the forces of resistance to tearing of the first, second and third ripstitch stage sections 7,3, 80 and 82 will be exerted parallel with respect to one another and therefore will be added to. Thus the force resistant to failure will be the additive combination of these three sections during the initial time period. Once the first ripstitch stage section 78 reaches the point of complete failure then the force will be reduced to only the additive combination of the second ripstitch stage section 80 and the third ripstitch stage section 82. Once the second ripstitch stage section 80 reaches full failure then the force of resistance between the drogue parachute 54 and the canopy 14 of the parafoil 10 will be only the force exerted by the third ripstitch stage section 82 itself. Once that third section reaches total failure the first fabric member 58 and the second fabric member 60 will separate and the canopy 14 of the parafoil 10 will be allowed to move to full first stage deployment:. This gradually decreasing attenuation force to the separation of the drogue parachute 54 from the parafoil 10 will allow tension to be maintained between the parafoil 10 and the payload 50 therebelow. This maintaining of a continuous tension will prevent the rebound which commonly occurs with such large scale parafoil designs. In such designs the drogue parachute can normally be made large enough to stabilize and decelerate the payload. However, the large surface area required for the drogue parachute often results in a high differential velocity between the payload and the parafoil itself. As this velocity differential is reduced to zero between the connecting bodies during deployment an initial force or snatch force develops. This force results in the rebound of the parafoil 10 and slack in the suspension lines 46 thereof. With such large scale parafoils as in the present invention initial inflation is normally not immediate because of the time involved with spreading out of the parafoil and thus there is little aerodynamic force present which is able to counteract against this rebound effect. As a result the parafoil 10 rebounds itself into its suspension lines 46 and then subsequently inflates. The parafoil 10 is often damaged from the abrasion from the suspension lines where many other inflation and/or deployment anomalies can occur. The use of the ripstitch modulator 12 in the present invention maintains connection between the parafoil 10 and the drogue parachute 54 during the initial stage of deployment and enhances the natural inflation characteristics of the parafoil 10.

A pilot parachute is sometimes used for a parafoil deployment following the drogue parachute release. However, they are not applicable for such large scale parafoil canopies because the extremely heavy payload can become unstable following release of the drogue parachute 54 and the deployment time of the parafoil 10 must be kept to an absolute minimum. Thus the sequencing normally required for the use of a pilot parachute is not available in such large scale applications.

Deployment of the parafoil 10 can be further enhanced by connecting of the ripstitch modulator 12 preferably with respect to the main centrally located air cell 22. This main air cell preferably is defined by an upper panel member 24 and a lower panel member 26 spaced apart from one another with a first side panel member 28 and second side panel member 30 extending therebetween. The first and second side panel members 28 and 30 are also spaced from one another to in this manner define the front opening 18 of the main air cell. In those configurations where the ripstitch modulator 12 is connected with respect to the main air cell 22 it is important that the main air cells be structurally reinforced. With such a configuration a main air cell reinforcement means 32 will be included. These can include a plurality of first reinforcing ribbons 34 extending along the first side panel member 28 for reinforcing thereof. The reinforcement can include a plurality of second reinforcing ribbons 36 extending vertically along the second side panel member 30 for reinforcing thereof. The upper panel member 24 can include an upper panel reinforcing member 38 and in a similar manner the lower panel member 26 can include a lower panel reinforcing member 40. Also a first reinforcing hem member 42 can be positioned between the first side panel member 28 and the upper panel member 24. Similarly a second reinforcing hem member 44 can be positioned between the upper panel member 24 and the second side panel member 30. As reinforced, the main air cell 22 is thus capable of withstanding the significant initial forces exerted thereof by the connection of the ripstitch modulator 12 with respect to the parafoil 10 preferably at locations along the main air cell 22. This means of deployment may further include a bridle 64 attached directly to the canopy 14 of the parafoil 10. The bridle preferably includes a first bridle line means 66 including a first frontal line 68 and first rear line 70 spaced apart from one another and connected along the intersection between the upper panel member 24 and the first side panel member 28. In a similar manner the bridle means 64 can include a second bridle line means 72 including a second frontal line 74 and a second rear line 76 spaced apart from one another and connected to the seam between the upper panel member 24 and the second side panel member 30. This configuration of the bridle means 64 will spread out the forces exerted through the energy attenuator 12 on the main air cell 22 of the canopy 14 over the reinforced main air cell 22 in such a manner as to facilitate deployment while at the same time prevent failure of the panels of the main air cell 22.

Figure 7:
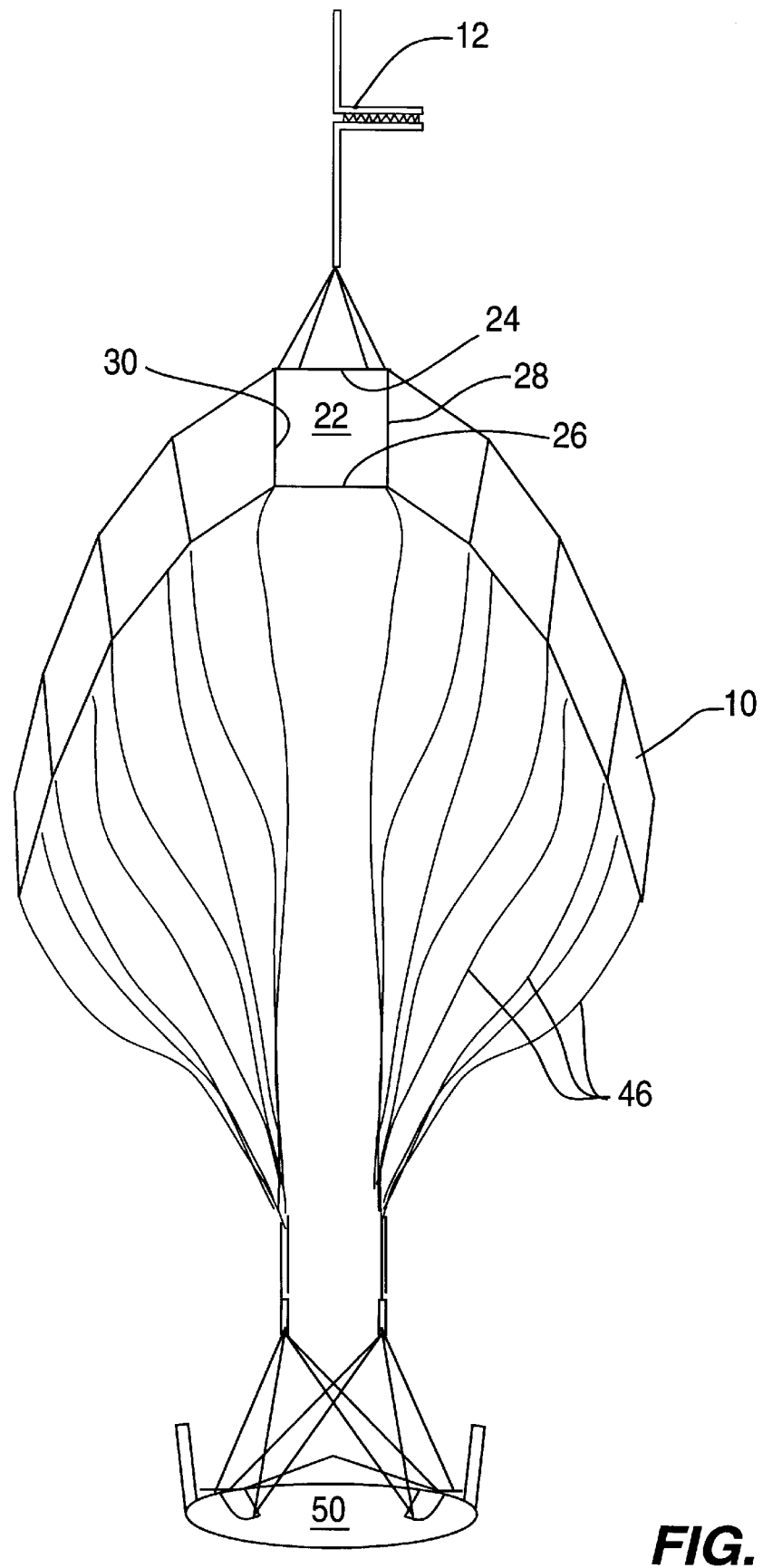
FIG. 7 is an illustration of an embodiment of the front view canopy of the parafoil showing the pyramidal shape that it assumes during the initial stage of deployment when the ripstitch modulator is attached preferably to the most centrally located air cell thereof.

In deployment when the main air cell 22 is the only air cell retained by the ripstitch modulator 12, the configuration of the parafoil 10 will assume a generally pyramidal shape as shown best in FIG. 7. This pyramidal shape will aid in enhancing the speed of inflation of the canopy 14 of the parafoil 10. This generally pyramidal shape will be maintained during the dissipation or controlled failure of the ripstitch modulator 12 thereby significantly facilitating deployment of the parafoil 10 during the initial stages of deployment thereof. Also entanglement of the suspension lines 46 is prevented and damage to the parafoil 10 resulting from line entanglements are prevented. The ripstitch attenuator 12 and the connection thereof with respect to the main air cell 22 promotes rapid inflation of the parafoil by eliminating this rebound and by maintaining the suspension lines between the main air cell 22 and the load under continuous tension.

The use of ripstitch modulator 12 with respect to a parafoil is one of the unique aspects of the present invention. The modulator 12 allows the first stage of parafoil 10 which is connected to the gradually separating drogue parachute 54 to be fully deployed by the maintaining of line tension thereof while at the same time not increasing the time required for total parafoil deployment and also without increasing the complexity of the overall configuration or deployment sequence.

It is important to appreciate that the restraining of the central or main air cell 22 is an important characteristic of the present invention when used in combination with the modulator 12. Restricting of the re-acceleration of the center of the parafoil results in the lateral portions of the canopy being forced down and away from the center thereby assuming the pyramidal shape shown in FIG. 7. This deployment shape has a symmetry which spreads out the parafoil laterally and forcibly begins the span-wise spreading thereof while maintaining tension on the suspension lines 46 extending between the main air cell 22 and the load 50. In this manner the randomness of initial canopy spreading has been reduced by securing of the ripstitch modulator 12 preferably with respect to the main air cell 22.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. A large scale parafoil apparatus with an energy attenuator for controlling initial deployment thereof comprising:
   A. a parafoil means comprising:
      (1) a canopy means defining a plurality of generally parallel inflatable air cells adjacently positioned and extending longitudinally with respect to one another, each air cell defining a front opening means for receiving air thereinto;
      (2) a plurality of suspension lines attached with respect to said canopy means and extending downwardly therefrom;
      (3) a dispersion riser means attached with respect to said suspension lines below said canopy means and being securable with respect to a load for suspension thereof below said canopy means;
   B. a canopy containment means attached to said parafoil means and adapted to maintain said parafoil means collapsed prior to deployment thereof;
   C. a drogue parachute means attached with respect to said canopy containment means, said drogue parachute means being operative upon deployment thereof to disengage said canopy containment means from said parafoil means to facilitate deployment thereof and of said canopy means; and
   D. an energy attenuating means including at least one ripstitch modulator means attached with respect to said drogue parachute means and said parafoil means and operative to facilitate controlled initial deployment thereof by maintaining attachment between said drogue parachute and said parafoil means for a limited period of time after release thereof by said canopy containment means from engagement with respect to said parafoil means, said energy attenuating means being operative to maintain tension on said suspension lines of said parafoil between said dispersion riser means and said canopy means thereof immediately after release of said canopy means and for a limited time period thereafter prior to full deployment thereof.

2. A large scale parafoil apparatus with an energy attenuator for controlling initial deployment thereof as defined in claim 1 wherein said ripstitch modulator means is operative to gradually fail over a limited period of time and allow said parafoil means to slowly pull away from said drogue parachute means while maintaining forcible resistance therebetween and also while maintaining forcible resistance between said canopy and said dispersion riser means during the initial deployment of said canopy means.

3. A large scale parafoil apparatus with an energy attenuator for controlling initial deployment thereof as defined in claim 1 wherein said ripstitch modulator means includes a plurality of ripstitch stage sections, each exerting separate forces in parallel with respect to one another, each of said ripstitch stage sections being operative over a different time period to provide gradually decreasing resistance over time against separation of said drogue parachute means from said parafoil means.

4. A large scale parafoil apparatus with an energy attenuator for controlling initial deployment thereof as defined in claim 1 wherein said energy attenuating means is secured with respect to said parafoil means at one of said air cells defined in said canopy means thereof.

5. A large scale parafoil apparatus with an energy attenuator for controlling initial deployment thereof as defined in claim 1 wherein said canopy means defines a main air cell which is positioned centrally within said parafoil means with an equal number of said air cells on each side laterally thereof and wherein said attenuating means is secured with respect to said main air cell.

6. A large scale parafoil apparatus with an energy attenuator for controlling initial deployment thereof as defined in claim 1 wherein said ripstitch modulator means comprises:
   A. a first fabric member secured with respect to said parafoil means and extending upwardly therefrom;
   B. a second fabric member secured with respect to said drogue parachute means and extending downwardly therefrom; and
   C. a ripstitch section securing said first fabric member and said second fabric member together with sewing, said ripstitch section being responsive to gradually fail after release of said parafoil means by said canopy containment means and to thereafter completely fail for releasing said first fabric member completely from said second fabric member resulting in simultaneous complete release of said drogue parachute means from said parafoil means to subsequently allow full initial deployment thereof.

7. A large scale parafoil apparatus with an energy attenuator for controlling initial deployment thereof as defined in claim 1 wherein said canopy means of said parafoil means is greater than 5000 square feet in surface area in order to be operative to handle large scale loads.

8. A large scale parafoil apparatus with an energy attenuator for controlling initial deployment thereof as defined in claim 1 wherein said energy attenuation means is attached with respect to said canopy containment means and wherein said canopy containment means is attached with respect to said drogue parachute means to maintain attachment of said energy attenuation means with respect to said drogue parachute through said canopy containment means.

9. A large scale parafoil apparatus with an energy attenuator for controlling initial deployment thereof as defined in claim 5 further comprising a bridle means attached with respect to said drogue parachute means and secured directly to said canopy means of said parafoil means at said main air cell only.

10. A large scale parafoil apparatus with an energy attenuator for controlling initial deployment thereof as defined in claim 9 wherein said main air cell includes:
   A. an upper panel member;
   B. a lower panel member spatially disposed below said upper panel member to define said main air cell therebetween;
   C. a first side panel member extending between said upper panel member and said lower panel member; and
   D. a second side panel member spatially disposed from said first side panel member and extending between said upper panel member and said lower panel member to further define said main air cell therebetween.

11. A large scale parafoil apparatus with an energy attenuator for controlling initial deployment thereof as defined in claim 10 wherein said bridle means includes:
   A. a first bridle line means operatively attached to said upper panel member of said main air cell adjacent said first side panel member thereof; and
   B. a second bridle line means operatively attached to said upper panel member of said main air cell adjacent said second side panel member thereof.

12. A large scale parafoil apparatus with an energy attenuator for controlling initial deployment thereof as defined in claim 11 wherein said first bridle line means includes:
   A. a first frontal line secured to said upper panel member of said main air cell adjacent said first side panel member; and
   B. a first rear line secured to said upper panel member of said main air cell adjacent said first side panel member at a position spatially disposed from said first frontal line to facilitate stability of support between said first bridle line means and said main air cell, said first rear line being secured to said main air cell at a position farther aft of said front opening means thereof than said first frontal line, said first frontal line being secured to said main air cell at a position closer to said front opening means thereof than said first rear line.

13. A large scale parafoil apparatus with an energy attenuator for controlling initial deployment thereof as defined in claim 11 wherein said second bridle line means includes:
   A. a second frontal line secured to said upper panel member of said main air cell adjacent said second side panel member; and
   B. a second rear line secured to said upper panel member of said main air cell adjacent said second side panel member at a position spatially disposed from said second frontal line to facilitate stability of support between said second bridle line means and said main air cell, said second rear line being secured to said main air cell at a position farther after of said front opening means thereof than said second frontal line, said second frontal line being secured to said main air cell at a position closer to said front opening means thereof than said second rear line.

14. A large scale parafoil apparatus with an energy attenuator for controlling initial deployment thereof as defined in claim 11 wherein said canopy means includes a main air cell reinforcement means to structurally strengthen said main air cell to facilitate attachment thereof with respect to said energy attenuation means during deployment of said canopy means of said parafoil means.

15. A large scale parafoil apparatus with an energy attenuator for controlling initial deployment thereof as defined in claim 14 wherein said main air cell reinforcement means includes:
   A. a plurality of first reinforcing ribbons extending vertically along said first side panel member for reinforcing thereof; and
   B. a plurality of second reinforcing ribbons extending vertically along said second side panel member for reinforcing thereof.

16. A large scale parafoil apparatus with an energy attenuator for controlling initial deployment thereof as defined in claim 14 wherein said main air cell reinforcement means includes:
   A. an upper panel reinforcing member extending across said upper panel member for reinforcing thereof to facilitate withstanding of forces exerted thereon during deployment of said canopy means of said parafoil means; arid
   B. a lower panel reinforcing member extending across said lower panel member for reinforcing thereof to facilitate withstanding of forces exerted thereon during deployment of said canopy means of said parafoil means.

17. A large scale parafoil apparatus with an energy attenuator for controlling initial deployment thereof as defined in claim 14 wherein said main air cell reinforcement means includes:
   A. a first reinforcing hem member extending along the intersection of said upper panel member and said first side panel member for reinforcing attachment therebetween and facilitating supporting of said energy attenuation means attached with respect thereto; and
   B. a second reinforcing hem member extending along the intersection of said upper panel member and said second side panel member for reinforcing attachment therebetween and facilitating supporting of said energy attenuation means attached with respect thereto.

18. A large scale parafoil apparatus with an energy attenuator for controlling initial deployment thereof as defined in claim 1 wherein said ripstitch modulator means includes:
   A. a first ripstitch section operative over a time period of A seconds to dissipate X pounds of deployment force;
   B. a second ripstitch section operative over a period of B seconds to dissipate Y pounds of deployment force, said second ripstitch section being operative in parallel with respect to said first ripstitch section; and C. a third ripstitch section operative over a period of C seconds to dissipate Z pounds of deployment force, said third ripstitch being operative in parallel with respect to said first ripstitch section and said second ripstitch section;

whereby said ripstitch modulator means is operative to dissipate X+Y+Z pounds of deployment force after actuation thereof for a time period of A seconds and thereafter is operative to dissipate Y+Z pounds of deployment force until the conclusion of B seconds and thereafter is operative to dissipate Z pounds of deployment force until the conclusion of C seconds.

19. A large scale parafoil apparatus as defined in claim 1 wherein said energy attenuating means is operative to separate after operation thereof to completely disengage said drogue parachute from said parafoil means and subsequently allow full initial deployment of said canopy means.

20. A large scale parafoil apparatus with an energy attenuator for controlling initial deployment thereof comprising:
A. a parafoil means comprising:
(1) a canopy means defining a plurality of generally parallel inflatable air cells adjacently positioned and extending longitudinally with respect to one another, each air cell defining a front opening means for receiving air thereinto, said canopy means defining a main air cell which is positioned centrally within said parafoil means with an equal number of said air cells on each side laterally thereof;
(2) a plurality of suspension lines attached with respect to said canopy means and extending downwardly therefrom;
(3) a dispersion riser means attached with respect to said suspension lines below said canopy means and being securable with respect to a load for suspension thereof below said canopy means,
B. a canopy containment means attached to said parafoil means and adapted to maintain said parafoil means collapsed prior to deployment thereof;
C. a drogue parachute means attached with respect to said canopy containment means, said drogue parachute means being operative upon deployment thereof to disengage said canopy containment means from said parafoil means to facilitate deployment thereof and of said canopy means;
D. an energy attenuating means including a ripstitch modulator means attached with respect to said drogue parachute means and with respect to only said main air cell of said parafoil means and being operative to facilitate controlled initial deployment thereof by maintaining attachment between said drogue parachute and said parafoil means for a limited period of time after release thereof by said canopy containment means from engagement with respect to said parafoil means, said energy attenuating means being operative to maintain tension on said suspension lines of said parafoil between said dispersion riser means and said canopy means thereof after release of said canopy means and for a limited time period thereafter prior to full deployment thereof, said energy attenuating means also being operative to separate after operation thereof to completely disengage said drogue parachute from said parafoil means and subsequently allow full initial deployment of said canopy means, said ripstitch modulator means including a plurality of ripstitch stage sections each exerting separate forces in parallel with respect to one another, each of said ripstitch stage sections being operative over a different time period to provide gradually decreasing resistance over time against separation of said drogue parachute means from said parafoil means, said energy attenuation means being attached with respect to said canopy containment means and said canopy containment means being attached with respect to said drogue parachute means to maintain attachment of said energy attenuation means with respect to said drogue parachute through said canopy containment means, said ripstitch modulator means including:
(1) a first fabric member secured with respect to said parafoil means and extending upwardly therefrom;
(2) a second fabric member secured with respect to said drogue parachute means and extending downwardly therefrom; and
(3) a ripstitch section securing said first fabric member and said second fabric member together with sewing, said ripstitch section being responsive to gradually fail after release of said parafoil means by said canopy containment means and to thereafter completely fail to release said first fabric member completely from said second fabric member resulting in simultaneous complete release of said drogue parachute means from said parafoil means to subsequently allow full initial deployment thereof.

21. A large scale parafoil apparatus with an energy attenuator for controlling initial deployment thereof comprising:
A. a parafoil means comprising:
(1) a canopy means defining a plurality of generally parallel inflatable air cells adjacently positioned and extending longitudinally with respect to one another, each air cell defining a front opening means for receiving air thereinto, said canopy means being greater than 5000 square feet in surface area in order to be operative to handle large scale loads, said canopy means defining a main air cell which is positioned centrally within said parafoil means with an equal number of said air cells on each side laterally thereof, said main air cell including:
a. an upper panel member;
b. a lower panel member spatially disposed below said upper panel member to define said main air cell therebetween;
c. a first side panel member extending between said upper panel member and said lower panel member;
d. a second side panel member spatially disposed from said first side panel member and extending between said upper panel member and said lower panel member to further define said main air cell therebetween;
e. a main air cell reinforcement means for structurally strengthening of said main air cell to facilitate attachment thereto; said main air cell reinforcement means including:
i. a plurality of first reinforcing ribbons extending vertically along said first side panel member for reinforcing thereof;
ii. a plurality of second reinforcing ribbons extending vertically along said second side panel member for reinforcing thereof;
iii. an upper panel reinforcing member extending across said upper panel member for reinforcing thereof to facilitate withstanding of forces exerted thereon during deployment of said canopy means of said parafoil means;
  iv. a lower panel reinforcing member extending across said lower panel member for reinforcing thereof to facilitate withstanding of forces exerted thereon during deployment of said canopy means of said parafoil means;
  v. a first reinforcing hem member extending along the intersection of said upper panel member and said first side panel member for reinforcing attachment therebetween and facilitating supporting of said energy attenuation means attached with respect thereto;
  vi. a second reinforcing hem member extending along the intersection of said upper panel member and said second side panel member for reinforcing attachment therebetween and facilitating supporting of said energy attenuation means attached with respect thereto;
 (2) a plurality of suspension lines attached with respect to said canopy means and extending downwardly therefrom;
 (3) a dispersion riser means attached with respect to said suspension lines below said canopy means and being securable with respect to a load for suspension thereof below said canopy means;
B. a canopy containment means attached to said parafoil means and adapted to maintain said parafoil means collapsed prior to deployment thereof;
C. a drogue parachute means attached with respect to said canopy containment means, said drogue parachute means being operative upon deployment thereof to disengage said canopy containment means from said parafoil means to facilitate deployment thereof and of said canopy means;
D. an energy attenuating means including a ripstitch modulator means attached with respect to said drogue parachute means and with respect to only said main air cell of said parafoil means and being operative to facilitate controlled initial deployment thereof by maintaining attachment between said drogue parachute and said parafoil means for a limited period of time after release thereof by said canopy containment means from engagement with respect to said parafoil means, said energy attenuating means being operative to maintain tension on said suspension lines of said parafoil between said dispersion riser means and said canopy means thereof immediately after release of said canopy means and for a limited time period thereafter prior to full deployment thereof, said energy attenuating means also being operative to separate after operation thereof to completely disengage said drogue parachute from said parafoil means and subsequently allow full initial deployment of said canopy means, said ripstitch modulator means including a plurality of ripstitch stage sections each exerting separate forces in parallel with respect to one another, each of said ripst:itch stage sections being operative over a different time period to provide gradually decreasing resistance over time against separation of said drogue parachute means from said parafoil means, said energy attenuation means being attached with respect to said canopy containment means and said canopy containment means being attached with respect to said drogue parachute means to maintain attachment of said energy attenuation means with respect to said drogue parachute through said canopy containment means, said ripstitch modulator means being operative to gradually fail over a limited period of time and allow said parafoil means to slowly pull away from said drogue parachute means while maintaining forcible resistance therebetween and also while maintaining forcible resistance between said canopy and said dispersion riser means during the initial deployment of said canopy means, said ripstitch modulator means including:
 (1) a first fabric member secured with respect to said parafoil means and extending upwardly therefrom;
 (2) a second fabric member secured with respect to said drogue parachute means and extending downwardly therefrom;
 (3) a ripstitch section securing said first fabric member and said second fabric member together with sewing, said ripstitch section being responsive to gradually fail after release of said parafoil means by said canopy containment means and to thereafter completely fail thereby allowing release of said first fabric member completely from said second fabric member resulting in simultaneous complete release of said drogue parachute means from said parafoil means to subsequently allow full deployment thereof;
E. a bridle means attached with respect to said drogue parachute means and secured directly to said canopy means of said parafoil means adjacent said main air cell thereof, said bridle means including:
 (1) a first bridle line means operatively attached to said upper panel member of said main air cell adjacent said first side panel member thereof, said first bridle line means including:
  a. a first frontal line secured to said upper panel member of said main air cell adjacent said first side panel member;
  b. a first rear line secured to said upper panel member of said main air cell adjacent said first side panel member at a position spatially disposed from said first frontal line to facilitate stability of support between said first bridle line means and said main air cell, said first rear line being secured to said main air cell at a position farther aft of said front opening means thereof than said first frontal line, said first frontal line being secured to said main air cell at a position closer to said front opening means thereof than said first rear line;
 (2) a second bridle line means operatively attached to said upper panel member of said main air cell adjacent said second side panel member thereof, said second bridle line means including:
  a. a second frontal line secured to said upper panel member of said main air cell adjacent said second side panel member; and
  b. a second rear line secured to said upper panel member of said main air cell adjacent said second side panel member at a position spatially disposed from said second frontal line to facilitate stability of support between said second bridle line means and said main air cell, said second rear line being secured to said main air cell at a position farther aft of said front opening means thereof than said second frontal line, said second frontal line being secured to said main air cell at a position closer to said front opening means thereof than said second rear line.

* * * * *

UNITED STATES PATENT AND TRADEMARK OFFICE
CERTIFICATE OF CORRECTION

PATENT NO. : 6,220,547 B1
DATED : April 24, 2001
INVENTOR(S) : Smith et al.

It is certified that error appears in the above-identified patent and that said Letters Patent is hereby corrected as shown below:

<u>Column 1,</u>
Line 4, prior to "BACKGROUND OF THE INVENTION", please insert:
-- STATEMENT REGARDING FEDERALLY SPONSORED RESEARCH OR DEVELOPMENT
     This invention was made with Government support under contract DAAK60-97-C-9226 awarded by the U.S. Army Soldier Systems Command (Natick, Ma). The Government has certain rights in the invention. --

Signed and Sealed this

Twenty-ninth Day of March, 2005

JON W. DUDAS
*Director of the United States Patent and Trademark Office*